(12) United States Patent
Blackburn

(10) Patent No.: US 7,264,276 B2
(45) Date of Patent: Sep. 4, 2007

(54) SHOCK ABSORBING SAFETY BELT

(75) Inventor: Jeffery S. Blackburn, Lake Orion, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 193 days.

(21) Appl. No.: 10/949,086

(22) Filed: Sep. 24, 2004

(65) Prior Publication Data

US 2005/0087974 A1 Apr. 28, 2005

Related U.S. Application Data

(60) Provisional application No. 60/507,057, filed on Sep. 26, 2003.

(51) Int. Cl.
*B60R 22/12* (2006.01)
*B60R 22/28* (2006.01)

(52) U.S. Cl. ............ 280/805; 280/801.1; 280/808

(58) Field of Classification Search ............ 297/470, 297/471, 472, 486–488, 468; 280/805, 801, 280/808, 733; *B60R 22/12, 22/14, 22/18, B60R 22/16, 22/28*
See application file for complete search history.

(56) References Cited

U.S. PATENT DOCUMENTS

| 4,018,478 | A | * | 4/1977 | Fiala et al. ................. 297/471 |
|---|---|---|---|---|
| 4,243,028 | A | * | 1/1981 | Puyana ........................ 602/62 |
| 4,741,574 | A | * | 5/1988 | Weightman et al. ......... 297/482 |
| 5,322,349 | A | * | 6/1994 | Gianino ...................... 297/482 |
| 5,877,677 | A | | 3/1999 | Fleming et al. |
| 6,260,926 | B1 | * | 7/2001 | Meraw ........................ 297/468 |
| 6,322,150 | B1 | * | 11/2001 | Harper et al. ............... 297/482 |
| 6,336,656 | B1 | | 1/2002 | Romeo |
| 6,375,218 | B2 | | 4/2002 | Iseki |
| 6,402,194 | B1 | | 6/2002 | Takeuchi |
| 6,419,264 | B1 | | 7/2002 | Tsuji et al. |
| 6,439,601 | B1 | | 8/2002 | Iseki |
| 6,709,729 | B2 | * | 3/2004 | Baruch ....................... 428/101 |
| 2002/0153761 | A1 | * | 10/2002 | Rivera et al. ............... 297/484 |
| 2003/0197413 | A1 | * | 10/2003 | Walker et al. ........... 297/452.19 |

FOREIGN PATENT DOCUMENTS

| BR | PI 9500210-3 | A | * | 1/1997 |
|---|---|---|---|---|
| JP | 1-153359 | A | * | 6/1989 |
| JP | 2000-108832 | A | * | 4/2000 |
| JP | 2001-106022 | A | * | 4/2001 |

* cited by examiner

*Primary Examiner*—Ruth Ilan
(74) *Attorney, Agent, or Firm*—L.C. Begin & Associates, PLLC.

(57) ABSTRACT

A safety belt construction (10) for use in a vehicle occupant protection system. The safety belt construction (10) includes a first panel (12), a second panel (14) affixed to the first panel (12) to form a pocket (16) therebetween, and an amount of an energy-absorbing material (18) secured in the pocket (16) to provide an energy-absorption capability to the safety-belt structure. A safety-belt system including a safety-belt incorporating an energy-absorbing material and a method for manufacturing the safety-belt are also disclosed.

25 Claims, 4 Drawing Sheets

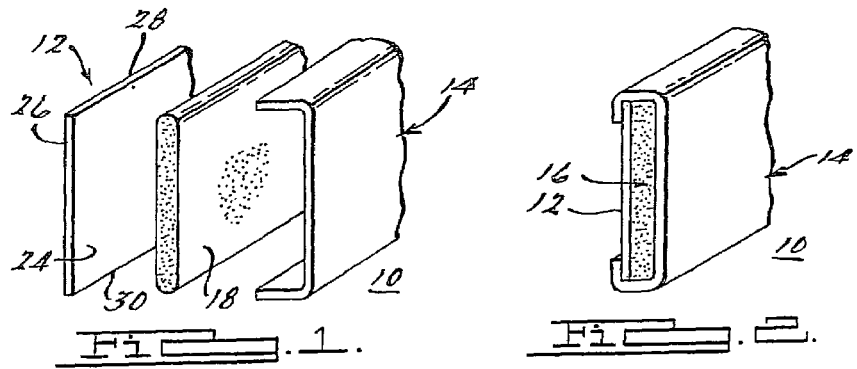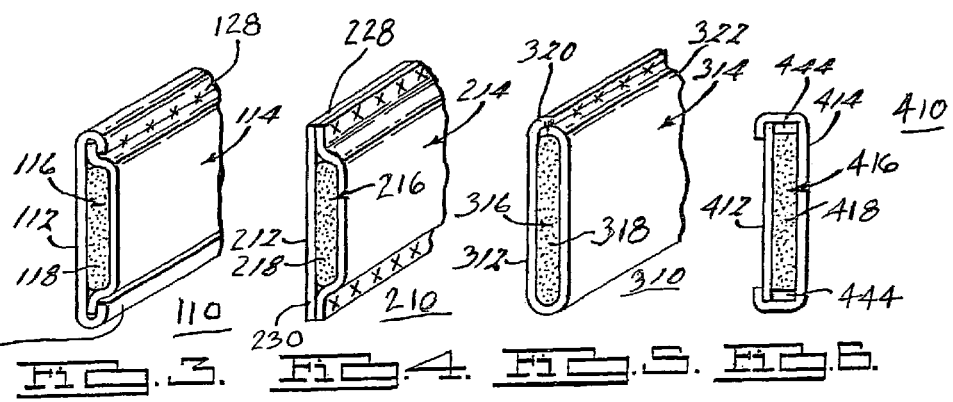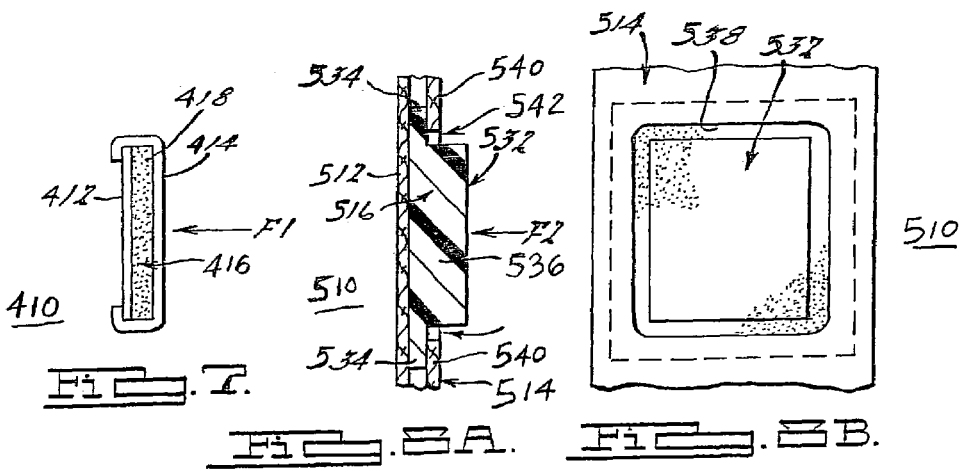

SHOCK ABSORBING SAFETY BELT

CROSS-REFERENCE TO RELATED APPLICATION

This application is entitled to and claims the benefit of Provisional Patent Application Ser. No. 60/507,057, filed on Sep. 26, 2003.

BACKGROUND OF THE INVENTION

The present invention relates generally to safety belt systems and, more particularly, to a safety belt system incorporating a shock-absorbing safety belt.

Ongoing improvements to vehicle occupant protection systems include the development of airbelts. Airbelt systems have been developed to reduce or minimize the force exerted by a safety belt on a vehicle occupant's chest or body in the event of an accident. Upon receipt of a signal from a known crash sensor algorithm, an inflator provides gas to a sealed and inflatable belt or tube to cushion the occupant's body as the occupant is restrained during the crash. U.S. Pat. Nos. 5,877,677, 6,375,218, 6,439,601, 6,419,264, 6,402,194, and 6,336,656 exemplify typical air belt assemblies and are each incorporated herein by reference.

The use of inflators, however, necessarily adds complexity and weight to the design of the airbelt assembly. For example, a gas generator must be plumbed to a sealed belt. In addition, the belt is usually formed from a special weave that accommodates the seal necessary to hold inflation gases. These and other considerations complicate the seat belt assembly in exchange for the associated benefits of an inflatable seat belt.

SUMMARY OF THE INVENTION

In one embodiment, the present invention encompasses a safety belt including a first panel, a second panel affixed to the first panel to form a pocket therebetween, and an amount of an energy-absorbing material secured in the pocket. In another embodiment, the invention encompasses a method for manufacturing a safety belt comprising the steps of providing a first panel, providing a second panel, providing an amount of an energy-absorbing material, and securing at least a portion of the energy-absorbing material in a pocket formed by affixing the second panel to the first panel. In yet another embodiment, the invention encompasses a safety belt system including a safety belt having a first panel, a second panel affixed to the first panel to form a pocket therebetween, and an energy-absorbing material secured in the pocket. The safety belt system also incorporates a belt retractor mechanism coupled to an end portion of the safety-belt, and a pretensioning mechanism coupled to the belt retractor to actuate the retractor in the event of a vehicle collision.

Incorporation of the energy-absorbing material into the structure of the safety-belt imparts shock-absorption capability to the structure of the belt without the need to inflate the belt. Since the belt does not need to be inflated, there is no need for an inflator or a special weave or seal to contain gas pressure upon inflation of the belt.

BRIEF DESCRIPTION OF THE DRAWINGS

In the drawings illustrating embodiments of the present invention:

FIG. 1 is an exploded perspective view of a safety belt in accordance with a first embodiment of the present invention;

FIG. 2 is a cross-sectional view showing the safety belt of FIG. 1 with a second panel of the belt affixed to a first panel along a face of the first panel;

FIG. 3 is a cross-sectional view showing the safety belt of FIG. 1 with a second panel of the belt affixed to a first panel along edge portions of the panels;

FIG. 4 is a cross-sectional view showing the safety belt of FIG. 1 with a second panel of the belt affixed to a first panel along edge portions the panels;

FIG. 5 is a cross-sectional view of a safety belt in accordance with another embodiment of the present invention;

FIG. 6 is a cross-sectional view of a safety belt in accordance with yet another embodiment of the present invention;

FIG. 7 is a cross-sectional view of the safety belt of FIG. 6 showing an effect of application of a load to the safety belt;

FIG. 8A is a cross-sectional view of a safety belt in accordance with yet another embodiment of the present invention; and FIG. 8B is a plan view of the safety belt of FIG. 8A.

DETAILED DESCRIPTION

Figure 9:
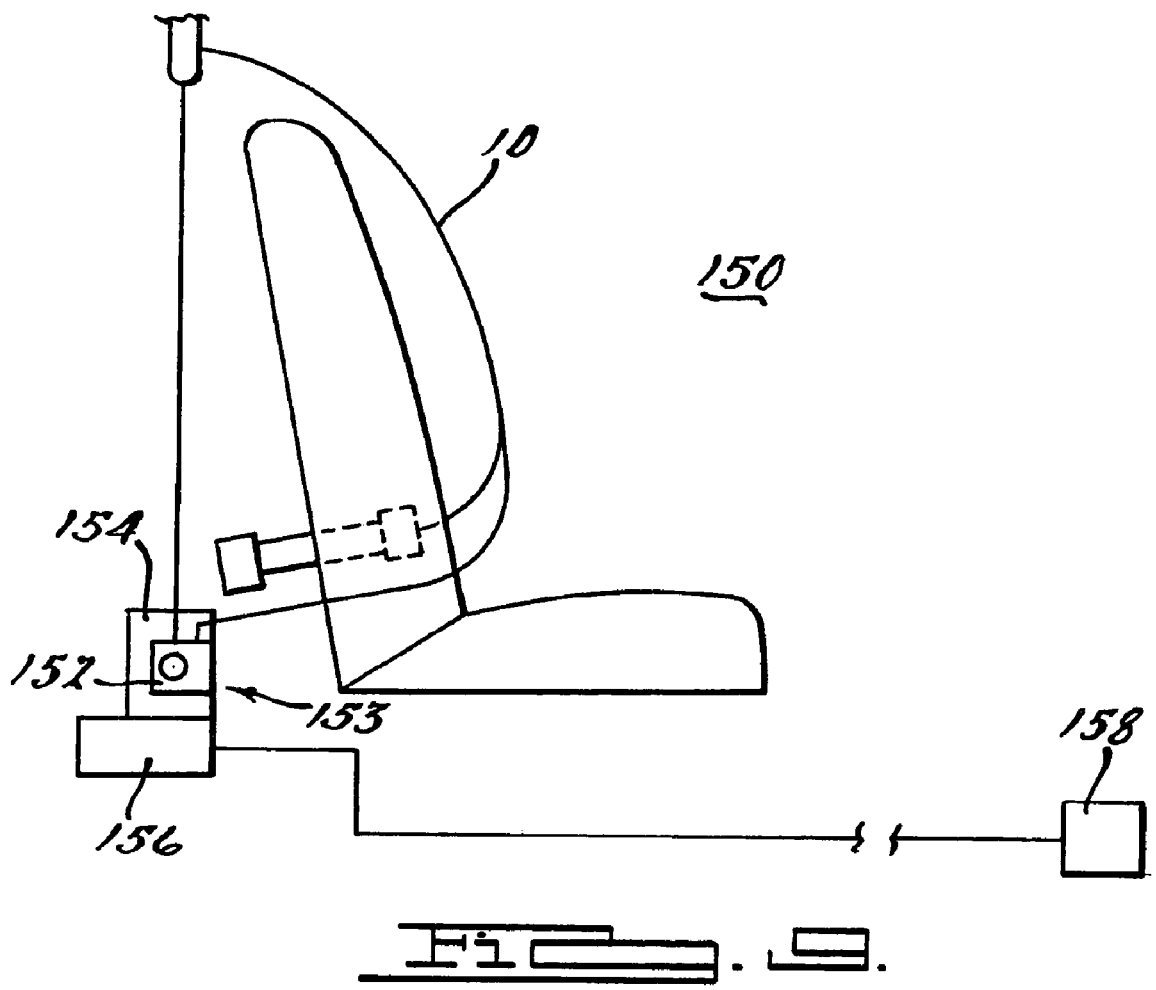
FIG. 9 is a schematic view of an exemplary seat belt assembly.

As shown in FIGS. 1-4, second panel 14 is affixed to first panel 12 so as to form a pocket 16 between the panels. One or both of panels 12 and 14 may be longitudinal, wherein first panel 12 and second panel 14 may form a pocket 16 that is substantially coextensive with a length of seat belt 10. Alternatively, a series of relatively smaller second panels 14 may be affixed to a single longitudinal first panel 12 to form a series of pockets 16. As shown in FIG. 2, second panel 14 may be affixed to first panel 12 along panel second face 26. Alternatively, second panel 14 may be affixed to first panel 12 along first face 24. Also, as seen in FIGS. 3 and 4, second panel 14 may be affixed to first panel 12 along one or more of first panel edge portions 28 and 30.

Figure 14:
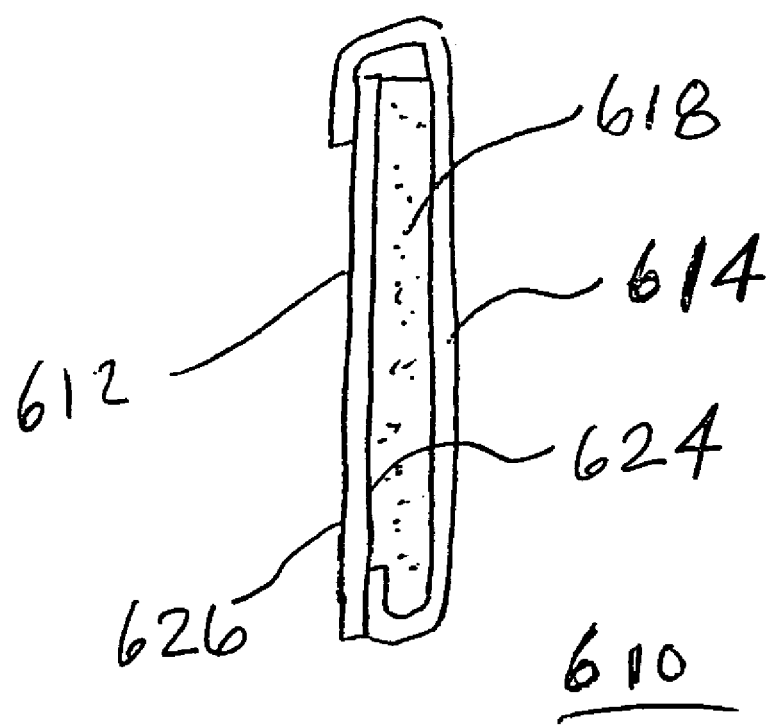
FIG. 14 is a cross-sectional view showing an embodiment of the safety belt in which a second panel of the belt is affixed to a first panel along opposite faces of the first panel.

Referring to FIGS. 1-7, similar elements of the different embodiments shown in the drawings have been given similar reference numerals. As shown in FIGS. 1-4, second panel 14, 114, 214 is affixed to first panel 12, 112, 212 so as to form a pocket 16, 116, 216 between the panels. One or both of panels 12, 112, 212 and 14, 114, 214 may be longitudinal, wherein first panel 12, 112, 212 and corresponding second panel 14, 114, 214 may form a pocket 16, 116, 216 that is substantially coextensive with a length of seat belt 10, 110, 210. Alternatively, a series of relatively smaller second panels may be affixed to a single longitudinal first panel to form a series of pockets. As shown in FIG. 2, second panel 14 may be affixed to first panel 12 along first panel second face 26. Alternatively, second panel 14 may be affixed to first panel 12 along first face 24. Also, as seen in FIGS. 3 and 4, second panel 114, 214 may be affixed to a corresponding first panel 112, 212 along one or more of first panel edge portions 128, 228 and 130, 230. FIG. 14 shows another embodiment 610 of the safety belt in which a second panel 614 of the belt is affixed to a first panel 612 along opposite faces 624 and 626 of the first panel.

Referring again to FIGS. 1-4, to impart shock-absorption capabilities to the structure of the safety belt, an amount of an energy-absorbing material 18, 118, 218 is secured within a corresponding pocket 16, 116, 216. The energy-absorbing material may be a material that will exhibit at least some plastic deformation under the loads applied by a vehicle occupant's body to a safety belt during rapid deceleration. Alternatively, an energy-absorbing material may be used which exhibits totally elastic behavior under the applied loads. It is also possible to use a material formed from a combination of elastic and plastically deformable materials.

In a particular embodiment, the energy-absorbing material secured in the seat belt pockets is a visco-elastic material. A visco-elastic material is defined as a material that exhibits properties of both viscous liquid materials and elastic solid materials. Visco-elastic materials have relatively high damping coefficients and excellent memory. These materials reduce the peak impulse force of an applied shock wave and distribute this force over a longer time frame. Additionally, the fluid-like viscous response of these materials lets them deform uniformly under load. Visco-elastic materials transmit applied forces in all directions and distribute an applied load over a large area. A portion of the energy stored in deflection of the material under load is returned when the material springs back to an equilibrium position. The remaining portion of the stored energy is dissipated as heat after the load is removed. One example of a visco-elastic material suitable for use in the present invention is SORBOTHANE®, manufactured by SORBOTHANE, INC. of Kent, Ohio. SORBOTHANE® is a thermoset, polyether-based polyurethane material having, in addition to the qualities described above, good resistance to ultra-violet radiation and an optimum performance temperature range of −20° F. to 160° F., particularly suitable for the application described herein. As is known in the art, one property which serves as a measure of a material's damping effectiveness is the "tan delta", which is a measure of the degree to which energy from an impulse applied to the material along an axis is translated or re-directed approximately 90° out of phase from (or substantially perpendicular to) the axis of the applied impulse. This translation of the applied force produces displacement of the material in a direction substantially perpendicular the axis of the applied force. The tan delta is thus the tangent of a phase difference between the displacement of the material and the force applied to the material. The tan delta for a given material can be measured for a variety of different impulses using known methods. For SORBOTHANE®, the tan delta at a frequency of 5 Hz is at least approximately 0.30.

The energy-absorbing material may be provided in any shape suitable for positioning and placement within the belt pockets. For example, the energy-absorbing material may be in granular form, or it may be formed into sheets, strips or other shapes.

Referring to FIG. 5, in another embodiment 310 of the present invention, second panel 314 is formed integral with first panel 312. An edge portion 320 of first panel 312 is joined with an edge portion 322 of second panel 314, and the panel edge portions are secured together using known methods. Energy-absorbing material 318 is positioned in pocket 316 prior to securing the panel edge portions 320 and 322 together.

FIGS. 6 and 7 show another embodiment 410 of the present invention in which at least one cavity 444 is formed in pocket 416 adjacent energy-absorbing material 418. Referring to FIG. 7, upon application of a load F1 to energy-absorbing material 418, the material will deform and spread outward as shown, and a portion of the material will elastically flow into cavity 444. Energy absorption capability of the energy-absorbing material may be increased by providing cavity 444 to accommodate deflection and elastic flow of the material. As seen in FIGS. 6 and 7, cavity 444 may be formed between the energy-absorbing material and a lateral edge of the belt. Cavity 444 may also be formed in (or may extend into) an area between the energy-absorbing material and a longitudinal end of the belt.

FIGS. 8A and 8B illustrate yet another embodiment 510 of the invention. In this embodiment, at least one of first panel 512 or second panel 514 includes one or more apertures 538 for receiving portions of the energy-absorbing material therethrough. In this embodiment, the energy-absorbing material is formed into a block 532 including an extension 536 and shoulders 534 projecting to either side of the extension. Extension 536 projects through aperture 538. Portions 540 of second panel 514 extend over shoulders 534 to secure the shoulders within pocket 516. Clearances 542 may be formed between extension 536 and the edges of aperture 538 to provide space into which extension 536 may deform under application of a load F2. This embodiment enables the thickness of the energy-absorbing material to be increased along specified portions of the belt without substantially increasing the thickness of the belt along its entire length. Flexibility of the thicker belt is also enhanced by the structural articulation provided by localization of the relatively thicker portions of the belt.

As used in a vehicle, any of the energy-absorbing safety-belt embodiments described herein may be anchored to the vehicle in a manner known in the art. In addition, more than one embodiment of the energy-absorbing belt may be employed in a vehicle. For example, one energy-absorbing belt may extend across the lap while another energy-absorbing belt extends across the chest.

Any of the energy-absorbing safety-belt embodiments described above may also be incorporated into a safety belt assembly, as seen in FIG. 9. Safety belt assembly 150 includes a safety belt housing 152 and a safety belt 10 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms that may be used in conjunction with the safety belt embodiments of the present invention are described in U.S. Pat. Nos. 5,743,480, 5,553,803, 5,667,161, 5,451,008, 4,558,832 and 4,597,546, and are incorporated herein by reference. Examples of typical pretensioners that may be employed with the safety belt embodiments of the present invention are described in U.S. Pat. Nos. 6,505,790 and 6,419,177, each incorporated herein by reference.

Safety belt system 150 may be in communication with a crash sensor 158 (for example, an inertia sensor or an accelerometer) and a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

Figure 10:
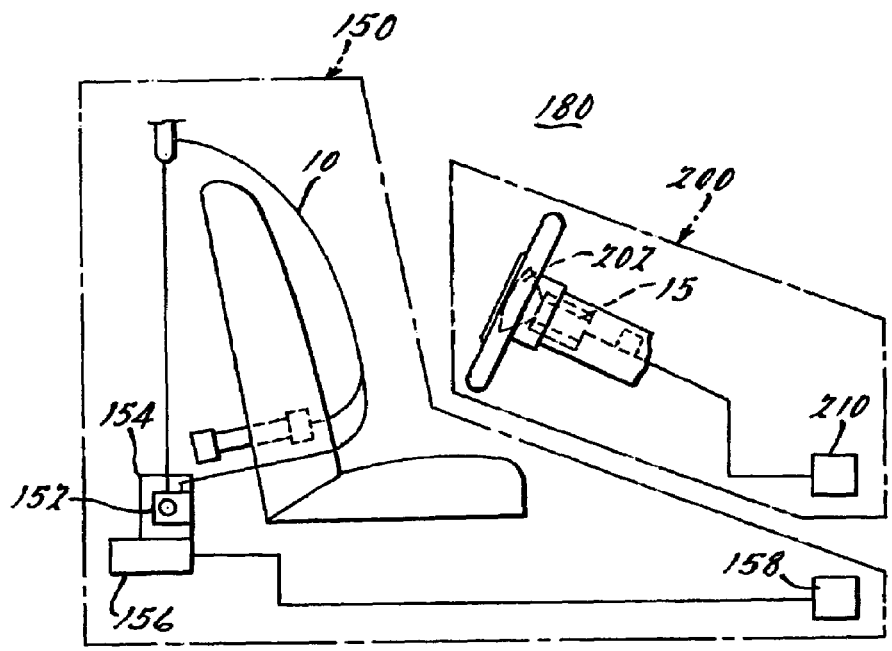
FIG. 10 is a schematic view of an exemplary vehicle occupant restraint system.

Referring to FIG. 10, safety belt assembly 150 may also be incorporated into a broader, more comprehensive vehicle occupant restraint system 180 including additional elements such as an airbag system 200. FIG. 10 shows a schematic diagram of one exemplary embodiment of such a restraint system. Airbag system 200 includes at least one airbag 202 and an inflator 204 coupled to airbag 202 so as to enable fluid communication with an interior of the airbag. Inflator 204 contains a combustible gas generant composition for generating inflation gas for inflating airbag 202, and at least one igniter for igniting the gas generant composition in the inflator. Examples of inflators which may be incorporated into airbag system 200 are described in U.S. Pat. Nos. 6,752,421, 5,806,888, and 6,341,799, each incorporated herein by reference. Airbag system 200 may also be in communication with a crash sensor 210 and a known crash sensor algorithm that signals actuation of airbag system 200 via, for example, activation of airbag inflator 204 in the event of a collision.

Figure 11:
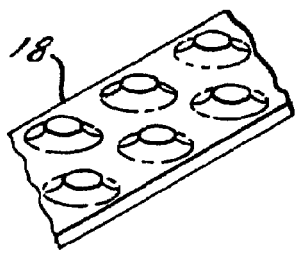
FIG. 11 is a perspective view of a portion of one embodiment of the shape of an energy-absorbing material usable in the present invention.
Figure 12:
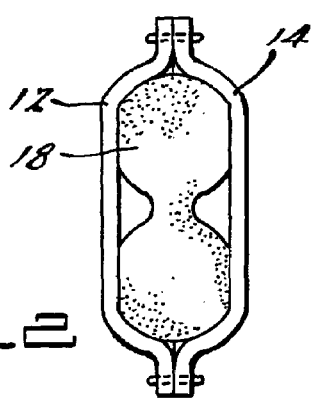
FIGS. 12 and 13 are cross-sectional views showing various additional embodiments of shaves of energy-absorbing material usable in the present invention.
Figure 13:
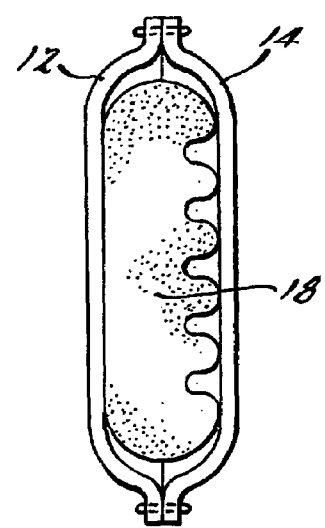

Finally, FIGS. 11-13 illustrate exemplary cross-sections of energy absorbing material 18 within the safety belt, taking advantage of the spring-like quality of the material 18 and thereby reducing the overall raw material 18 employed within the pocket 16.

It should be understood that the preceding discussion merely exemplifies the present invention and that numerous changes to the disclosed embodiments can be made without departing from the scope of the invention. For example, the present invention is applicable to any inflatable vehicle occupant safety device, to include airbags and airbelts. The preceding description, therefore, is not meant to limit the scope of the invention. Rather, the scope of the invention is to be determined by the appended claims and their equivalents.

The invention claimed is:

1. A safety belt assembly comprising:
   a housing; and
   a safety belt extending from the housing, the safety belt having a first panel, a second panel affixed to the first panel to form a pocket therebetween, and an amount of an energy-absorbing material secured in the pocket, wherein at least one of the panels includes an aperture for receiving a portion of the energy-absorbing material therethrough.

2. The safety belt assembly of claim 1 wherein the energy-absorbing material comprises an elastic material.

3. The safety belt assembly of claim 1 wherein the energy-absorbing material comprises a visco-elastic polymer.

4. The safety belt assembly of claim 1 wherein the second panel is formed integral with the first panel.

5. The safety belt assembly of claim 1 wherein at least the first panel is a longitudinal panel.

6. The safety belt assembly of claim 1 wherein the second panel is affixed to the first panel along at least one face of the first panel.

7. The safety belt assembly of claim 6 wherein the second panel is affixed to the first panel along opposite faces of the first panel.

8. The safety belt assembly of claim 1 wherein the second panel is affixed to the first panel along at least one edge portion of the first panel.

9. The safety belt assembly of claim 8 wherein the second panel is affixed to the first panel along opposite edge portions of the first panel.

10. The safety belt assembly of claim 1 further comprising at least one cavity formed in the pocket adjacent the energy-absorbing material for receiving a portion of the energy-absorbing material therein upon application of a load to the material.

11. The safety belt assembly of claim 10 wherein the cavity resides intermediate the energy-absorbing material and a lateral edge of the belt.

12. The safety belt assembly of claim 10 wherein the cavity resides intermediate the energy-absorbing material and a longitudinal end of the belt.

13. The safety belt assembly of claim 1 in combination with:
   a belt retractor mechanism coupled to an end portion of the safety-belt; and
   a safety belt pretensioner coupled to the belt retractor mechanism to actuate the retractor in the event of a collision.

14. The combination of claim 13 wherein the pretensioner is actuated by a pyrotechnic device.

15. The combination of claim 13 wherein the belt pretensioner is in communication with a crash event sensor including a crash sensor algorithm that signals actuation of the belt pretensioner in the event of a collision.

16. The safety belt assembly of claim 1 wherein the energy-absorbing material comprises a material wherein a tangent of a phase difference between a displacement of the material and a force applied to the material (tan δ) at a frequency of 5 Hz is at least approximately 0.30.

17. A method for manufacturing a safety belt comprising the steps of:
   providing a first panel;
   providing a second panel;
   providing an amount of a energy-absorbing material;
   providing an aperture in at least one of the first and second panels for receiving a portion of the energy-absorbing material therethrough; and
   securing at least a portion of the energy-absorbing material in a pocket formed by affixing the second panel to the first panel.

18. The method of claim 17 wherein the step of providing a first panel comprises the step of providing a longitudinal panel.

19. The method of claim 17 further comprising the step of forming a cavity adjacent the energy-absorbing material for receiving a portion of the energy-absorbing material therein upon application of a load to the energy-absorbing material.

20. The method of claim 19 wherein the step of forming a cavity comprises forming a cavity intermediate the energy-absorbing material and a lateral edge of the belt.

21. The method of claim 19 wherein the step of forming a cavity comprises forming a cavity intermediate the energy-absorbing material and a longitudinal end of the belt.

22. The method of claim 17 wherein the energy-absorbing material comprises an elastic material.

23. The method of claim 17 wherein the energy-absorbing material comprises a visco-elastic polymer.

24. The method of claim 23 wherein the visco-elastic polymer comprises a material wherein a tangent of a phase difference between a displacement of the material and a force applied to the material (tan δ) at a frequency of 5 Hz is at least approximately 0.30.

25. A safety belt assembly including:

a housing; and a safety belt extending from the housing, the safety belt having a first panel, a second panel affixed to the first panel to form a pocket therebetween, and an amount of an energy-absorbing material secured in the pocket, wherein at least one of the panels includes an aperture for receiving a portion of the energy-absorbing material therethrough, the energy-absorbing material comprising a visco-elastic polymer wherein a tangent of a phase difference between a displacement of the material and a force applied to the material (tan δ) at a frequency of 5 Hz is at least approximately 0.30.

* * * * *